United States Patent [19]

Pataki

[11] 4,033,441
[45] July 5, 1977

[54] MERGING OR BLENDING TECHNIQUES FOR SMALL PARTS

[75] Inventor: William V. Pataki, Ephrata, Pa.

[73] Assignee: Aluminum Company of America, Pittsburgh, Pa.

[22] Filed: Sept. 30, 1976

[21] Appl. No.: 728,271

Related U.S. Application Data

[63] Continuation-in-part of Ser. No. 587,170, June 16, 1975, abandoned.

[52] U.S. Cl. .................. 193/38; 10/155 A; 10/165; 198/448; 221/95; 221/133
[51] Int. Cl.² ........................................ B65G 11/00
[58] Field of Search ......... 10/155 R, 155 A, 162 R, 10/162 A, 165; 198/389, 448; 221/95, 133, 158; 193/46, 38

[56] References Cited

UNITED STATES PATENTS

| | | | |
|---|---|---|---|
| 2,753,975 | 7/1956 | Day et al. ..................... | 198/448 |
| 2,889,023 | 6/1959 | Moncrieff ..................... | 221/158 |
| 3,156,342 | 10/1964 | Brewer ......................... | 198/389 |
| 3,221,857 | 12/1965 | Keller ........................... | 193/46 |
| 3,226,744 | 1/1966 | Marechal et al. ............ | 10/155 A |
| 3,406,414 | 10/1968 | Kulaga et al. ................ | 10/155 R |
| 3,745,599 | 7/1973 | Ringland ...................... | 10/155 A |
| 3,906,567 | 9/1975 | Barth et al. .................. | 10/155 A |

FOREIGN PATENTS OR APPLICATIONS

| | | | |
|---|---|---|---|
| 866,798 | 9/1941 | France ......................... | 221/133 |

*Primary Examiner*—E. M. Combs
*Attorney, Agent, or Firm*—David W. Brownlee; William J. O'Rourke, Jr.

[57] ABSTRACT

The invention relates to methods and means for combining two merging streams of small parts having heads and shanks comprising progressing each of the streams in the same general direction and with the heads aligned and the shanks transverse to the direction of progression. The streams, or paths, are lead at different levels and in different horizontal positions at the last part of the progression and then the streams or paths are progressively merged at the last part of the progression in at least the horizontal direction so the shanks of the parts in one path become interposed between the heads of the parts in the other path as the paths are merged into a single path without stoppage.

3 Claims, 5 Drawing Figures

MERGING OR BLENDING TECHNIQUES FOR SMALL PARTS

CROSS REFERENCE TO OTHER APPLICATIONS

This is a continuation-in-part of application Ser. No. 587,170, filed June 16, 1975, abandoned.

BACKGROUND OF THE INVENTION

1. Field of Invention

The invention relates to methods and means for combining two merging streams of parts having heads and shanks so that the merged paths coincide without stoppage.

2. Description of the Prior Art

In the prior art there have been many devices for handling small parts. Brewer U.S. Pat. No. 3,156,342 discloses feeding rivets by a plurality of chutes which merge in a single chute. Brown et al. U.S. Pat. No. 3,638,260 discloses the assembly of screw blanks and washers prior to threading the blanks. In Brown, there are two chutes, one for the screw blanks and one for the washers and the washers and the screw blanks are combined. Cooley et al. U.S. Pat. No. 3,323,155 discloses pneumatic means for propelling small parts.

Moncrieff U.S. Pat. No. 2,889,023 discloses an apparatus for orienting asymmetrical cylindrical gears wherein the gears fall into one of two receiving troughs arranged in opposite semicircular relation to each other. The troughs, at the ends thereof, are arranged such that an upper trough directly overlies the lower trough and, therefore, the gears rolling in the upper trough fall downwardly into the lower trough to effect merger in the lower trough.

The conventional method of combining separate streams of similar things, as illustrated by the disclosure of Brown, is adequate for small pieces and for relatively slow speeds of 60 pieces per minute. However, above such speeds the pieces tend to restrict one another from flowing into a single track and tend to occupy the same space at the same time, producing stoppages and irregularities of feeding.

Accordingly, a new and improved method and means is desired for merging or blending two streams of small parts having a head and a shank into a single stream without stoppage.

SUMMARY OF THE INVENTION

This invention may be summarized as providing methods and means for combining two merging streams of small parts having heads and shanks comprising progressing each of the streams in the same general direction and with the heads aligned and the shanks transverse to the direction of progression. The streams, or paths, are lead at different levels and in different horizontal positions at the last part of the progression and then the streams or paths are progressively merged at the last part of the progression in at least the horizontal direction so the shanks of the parts in one path become interposed between the heads of the parts in the other path as the paths are merged into a single path without stoppage.

Among the advantages of the subject invention is a provision for a new and improved method for combining streams or paths of small parts having a head and a shank without stoppage.

An objective of this invention is to provide a means for progressively simultaneously merging the end portions of vertically and horizontally misaligned paths of small parts having a head and a shank in both the vertical and horizontal directions so the shanks of the parts in one path continuously become interposed between adjacent heads of the parts in the other path.

The above and other objectives and advantages of this invention will be more fully understood and appreciated with reference to the following detailed description and drawings appended hereto.

DESCRIPTION OF THE PREFERRED EMBODIMENTS

Figure 1:
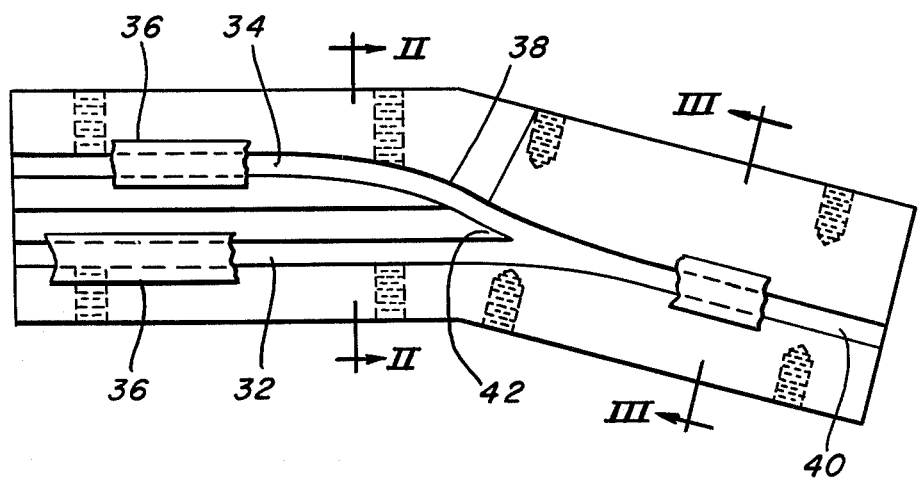
FIG. 1 is a top plan view of the invention in a simplified form, partly broken away.
Figure 2:
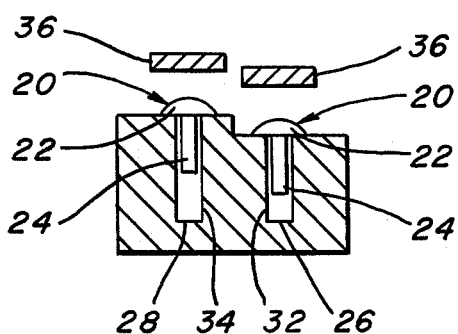
FIG. 2 is a view of parts through II—II of FIG. 1.
Figure 3:
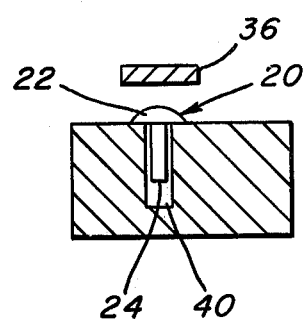
FIG. 3 is a view of parts through III—III of FIG. 1.

In the invention, two streams of identical parts are moved along paths having the heads aligned and having the shanks transverse to the direction of progression. The parts are preferably transported by pneumatic means along guideways and the preferred orientation is to put the head above and the shank vertically below.

These guideways are vertically misaligned so that one guideway at the latter part of the path, at least, will lie in a plane above the other guideway. The latter part of the guideways are also horizontally misaligned, but generally proceeding in the same direction. At the point of merger, the paths are progressively brought into coincidence, so that the shank of a part on one path is inserted between the heads of adjacent parts in the other path. Thereafter the inserted shank will move downwardly, with respect to the adjacent heads such that all of the heads are horizontally aligned in the same plane.

The parts such as screws, screw blanks, rivets and the like 20 have heads 22 and shanks 24. The heads 22 are preferably curved semispheres or filleted at the edges with generally planar bottom surfaces. The shanks 24 are generally cylindrical or tubular in configuration and extend from the center of the bottom surface of the head 22.

As illustrated in the drawings, the parts 20 are progressed along two paths 26 and 28 by means such as pneumatic jets 30 or by producing movement of the guideways by oscillation, vibration or jiggling. The paths 26 and 28 are preferably created by guideways 32 and 34. These guideways 32 and 34 may be provided with roofs 36.

The guideway 32 is permissibly of downwardly sloping form while the guideway 34 proceeds in the same general direction at a higher level and also preferably in a somewhat diverging path. The higher guideway 34 need only be progressively horizontally merged with the lower guideway 32 provided that the shanks 24 of the parts in the upper guideway 34 extend downwardly a sufficient distance to insure that these shanks 24 are interposed between the heads 22 of the parts 20 in the lower guideway 32 as horizontal merger is accomplished. Alternatively, the higher guideway 34 may extend downwardly at 38 and may converge progressively simultaneously in both the vertical and horizontal directions toward the other guideway 32 to form a single meshed guideway 40.

Figure 4:
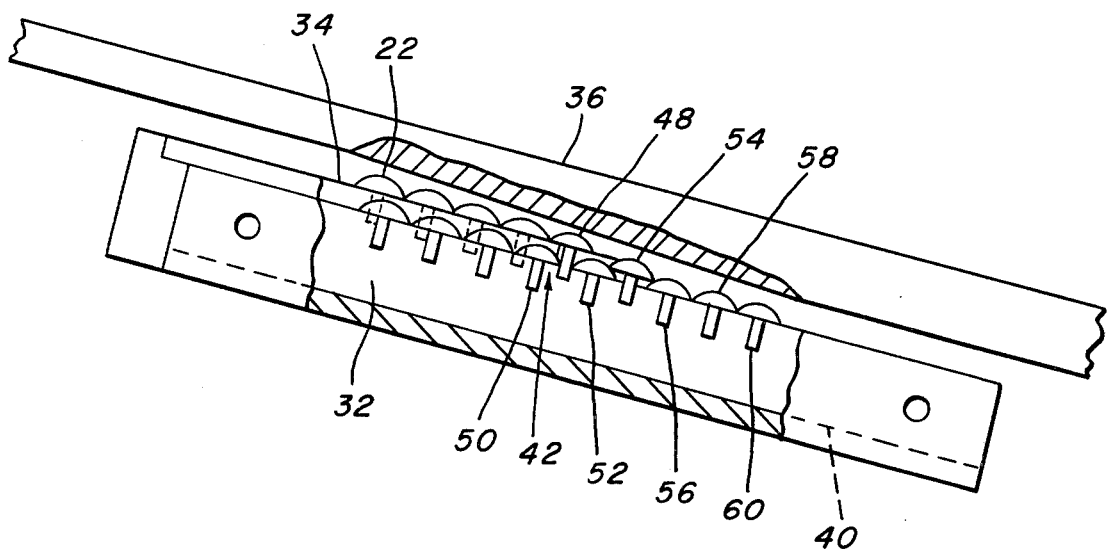
FIG. 4 is a simplified side elevation of FIG. 1, partly broken away.
Figure 5:
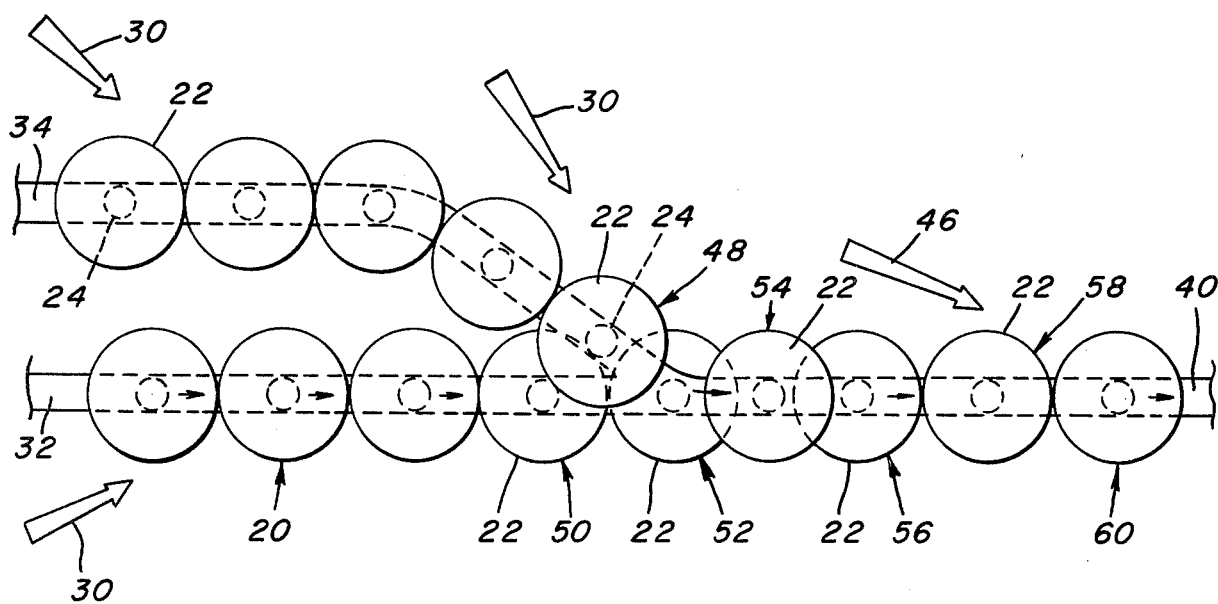
FIG. 5 is a further enlarged simplified top plan view.

At the point 42 where the coincidence of the two guideways 32 and 34 begins, there may be a gradual or an abrupt change in the level of the parts 20 in the upper guideway 34. At that point 42 the guideway 40 begins, and a pneumatic jet 46 may be provided to propel the parts along the guideway 40. As shown in FIGS. 4 and 5, the change in level and direction of the parts in the upper guideway 34 with respect to the lower guideway 32 is sufficient to allow the shank 24 of a part 48 from the upper guideway 34 to become interposed between, and in abutting relationship with, the heads 22 of the previously adjacent parts 50 and 52 in the lower guideway 32 without stoppage. It would be apparent to those skilled in the art that this may be accomplished by providing a slope which may vary with the size, weight and configuration of the parts being merged. It should also be apparent that merger may be accomplished without changing the slope of either guideway at the last part of progression. For example, the parts 20 in the upper guideway 34 vertically and horizontally misaligned with the parts 20 in the lower guideway 32 may be merged just in the horizontal direction as long as the maintained vertical misalignment is such that the shanks 24 of the parts 20 in the upper guideway 34 become interposed between the heads 22 of the parts 20 in the lower guideway 32 without stoppage.

Thus, the parts which were preceding along the end portions of the upper and lower guideways are made to merge by interposing the shank 24 of a part 48 from the upper guideway 34 between the heads of two adjacent parts 50 and 52 in the lower guideway before the heads from both guideways are finally brought into horizontal alignment. As shown in FIGS. 4 and 5 the head 22 of the part 48 from the upper guideway 34 overlies the heads 22 of the adjacent parts 50 and 52 in the lower guideway 32. The head 22 of a part 54 from the upper guideway 34 may continue to overlie the heads 22 of the previously adjacent parts 52 and 56 from the lower guideway 32 for some time after the parts are merged in guideway 40. After the shank is interposed between the heads in the lower guideway, the merger of the parts proceeds to complete vertical and horizontal alignment whereby the shank of the part 48 proceeds downwardly with respect to the heads of the parts 50 and 52. After the head of the part 48 overlies the heads of the parts 50 and 52, the head of the higher part 48 will drop between the heads of the lower parts 50 and 52 while maintaining continuous progression of the parts without stoppage. As shown in FIG. 5, the head 22 of the part 58 which was fed from the upper guideway 34 has dropped into complete horizontal alignment between the heads 22 of the previously adjacent parts 56 and 60 which were fed from the lower guideway 32.

Thus, screw blanks which were fed separately at 1000 blanks per minute were combined into a single stream which handled without incidence 2000 blanks per minute which necessarily did not result in stoppage or other feeding irregularities.

The exact contour of the two merging tracks may be varied to suit the conditions. For example, the beginning or middle portions of the guideways may or may not be in vertical alignment or horizontal alignment depending upon various operating conditions. However, this invention requires that the end portions of the merging guideways, or the last part of progression of the paths, just prior to the point of merger, be horizontally and vertically misaligned. With such construction, the end portions of the merging guideways or paths may be progressively merged in at least the horizontal direction into a merged guideway in which both sets of parts are finally brought to the same level and to the same horizontal path.

Whereas the particular embodiments of this invention have been described above for purposes of illustration, it will be apparent to those skilled in the art that numerous variations of the details may be made without departing from the invention.

What is claimed is:

1. A method of combining two merging streams of parts having heads and shanks, comprising:
   progressing the stream of parts in different vertical planes with the parts in each stream having their shanks vertically oriented and their heads aligned, and with both streams of parts progressing generally in the same direction;
   leading the steams of the progressing parts at different levels such that at least a portion of the shank of the parts in the upper stream lies in the same plane as the heads of the parts in the lower stream in overlapping relationship; and
   while maintaining the overlapping relationship, progressively merging the streams at the last part of the progression in the horizontal direction to bring the parts in the merged stream into the same vertical plane;
   whereby the shanks of the parts in the upper stream become interposed between the heads of the parts in the lower stream as the streams are merged into a single stream without stoppage.

2. A method of combining two merging streams of parts having heads and shanks, comprising:
   progressing each stream of parts with the shanks vertically oriented, with the heads aligned, and with both streams of parts progressing generally in the same direction;
   leading the streams of the progressing parts at different levels such that at least a portion of the shank of the parts in the upper stream lies in the same plane as the heads of the parts in the lower stream in overlapping relationship; and
   while maintaining the overlapping relationship, merging the streams at the last part of the progression progressively simultaneously in both the vertical and horizontal directions;
   whereby the shanks of the parts in one stream become interposed between the heads of the parts in the other stream as the streams are merged into a single stream without stoppage.

3. A conveying mechanism for small parts, each having a head and a shank, comprising:
   a first guideway for a first set of parts;
   a second guideway for a second set of identical parts;
   means for progressing the parts in the guideways; said first and second guideways being constructed and arranged for leading the first and second sets of identical parts at different levels such that at least a portion of the shank of the parts in the first guideway lies in the same plane as the heads of the parts in the lower guideway in overlapping relationship; and
   an end portion of the second guideway being in the same general direction as an end portion of the first guideway but vertically and horizontally misaligned for maintaining said first and second sets of identical parts in said overlapping relationship, with the end portions of the first and second guideways merging asymptotically in at least the horizontal direction into a merged guideway;

whereby the shanks of the parts progressing in the first guideway become interposed between the heads of the parts progressing in the second guideway as the guideways are merged into the merged guideway in which both sets of progressing parts are finally brought to the same level and to the same horizontal path.

* * * * *